UNITED STATES PATENT OFFICE.

SANROKU HATTORI, OF TOKYO, JAPAN.

CARBON-PAPER.

1,292,404.     Specification of Letters Patent.     Patented Jan. 21, 1919.

No Drawing.     Application filed April 26, 1918. Serial No. 231,002.

*To all whom it may concern:*

Be it known that I, SANROKU HATTORI, a subject of the Emperor of Japan, and residing at No. 367 Kirigaya, Osaki, Ebaragun, Tokyo, Japan, have invented certain new and useful Improvements in Carbon-Paper, of which the following is a specification.

My present invention relates to improved carbon paper, which is produced by coating paper with a particular paint-like composition herein described, which coating operation may be conveniently effected by passing the paper over a roll dipping into the composition, or in any other suitable manner.

The composition contains as its basis, barium stearate, or equivalent material, mixed with an oil, such as olive oil, peanut oil, castor oil or the like, together with a suitable pigment or coloring matter. In place of barium stearate, I can use other soaps having similar properties, for example, soaps of the metals, aluminum, magnesium or numerous others. Barium stearate may be produced by saponifying stearin to produce a soluble alkali metal soap solution to which is added a solution of barium chlorid or other soluble salt of barium or a soluble salt of magnesium, aluminum, etc. After filtration and drying the barium stearate is ready for use.

As an example of the preparation of the coating compounds the following is given: say, 3 kgs. of barium stearate are mixed with 2¼ kgs. of castor oil and 3¼ kgs. of violet lake, the entire mixture being well kneaded and agitated, for example, in a paint mill. The paper is then coated with this mixture in any suitable manner.

Instead of stearin, ordinary soap-stock or animal or vegetable oil or wax, such as olive oil or peanut oil, and the like, can be used. In place of castor oil, with which to mix the soap, other fatty oils can be employed. In place of violet lake, various other pigments can be used.

Carbon paper made as above described is of a superior quality, does not smut, does not soil the hands of the user, and is very durable, and can be cheaply prepared. This carbon paper has the further advantages that it gives a good clear copy, and can be kept indefinitely without injury, irrespective of climatic conditions.

In the appended claims, wherever the term "barium" is employed, it is my intention to include equivalent metals, such as aluminum, magnesium, etc.

What I claim is:

1. An improved manifolding sheet comprising paper coated with a composition having as essential constituents, barium stearate mixed with oily material and pigment.

2. An improved manifolding sheet comprising paper coated with a composition containing as essential constituents a barium soap blended with an oily material and a coloring matter.

In testimony whereof I have hereunto set my hand in presence of two subscribing witnesses.

SANROKU HATTORI.

Witnesses:
    GENJI KURIBARO,
    SUGAO SAGA.